April 30, 1929.  B. BURVENICK  1,711,445
ARTICLE SHAPING APPARATUS
Filed Jan. 13, 1928  2 Sheets-Sheet 1
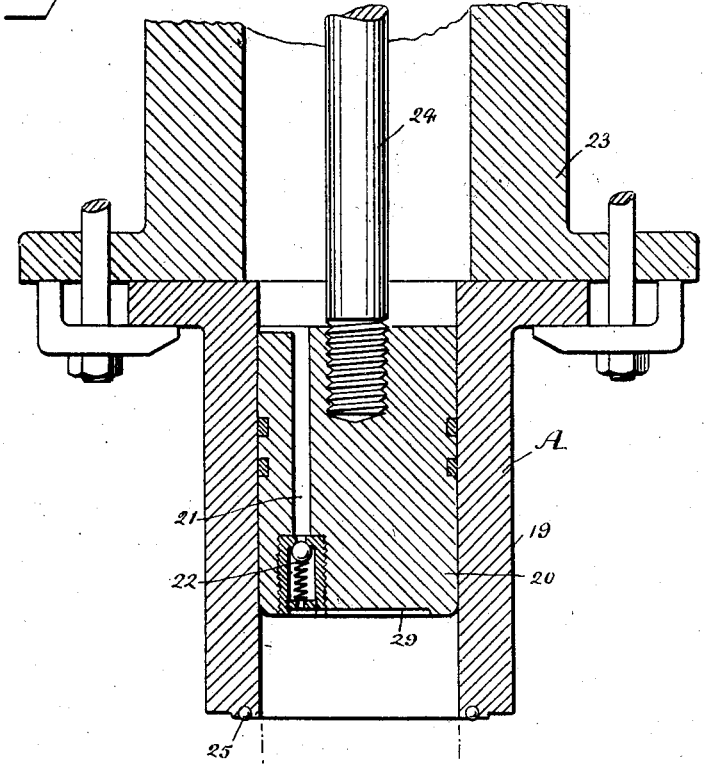
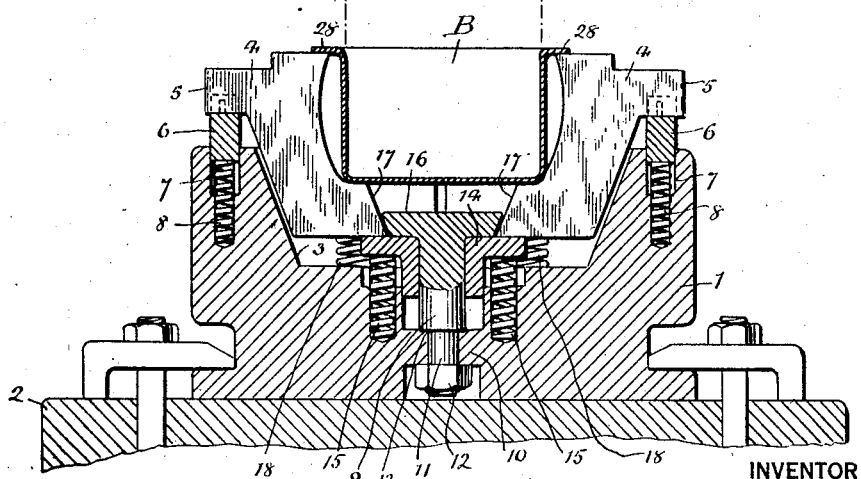

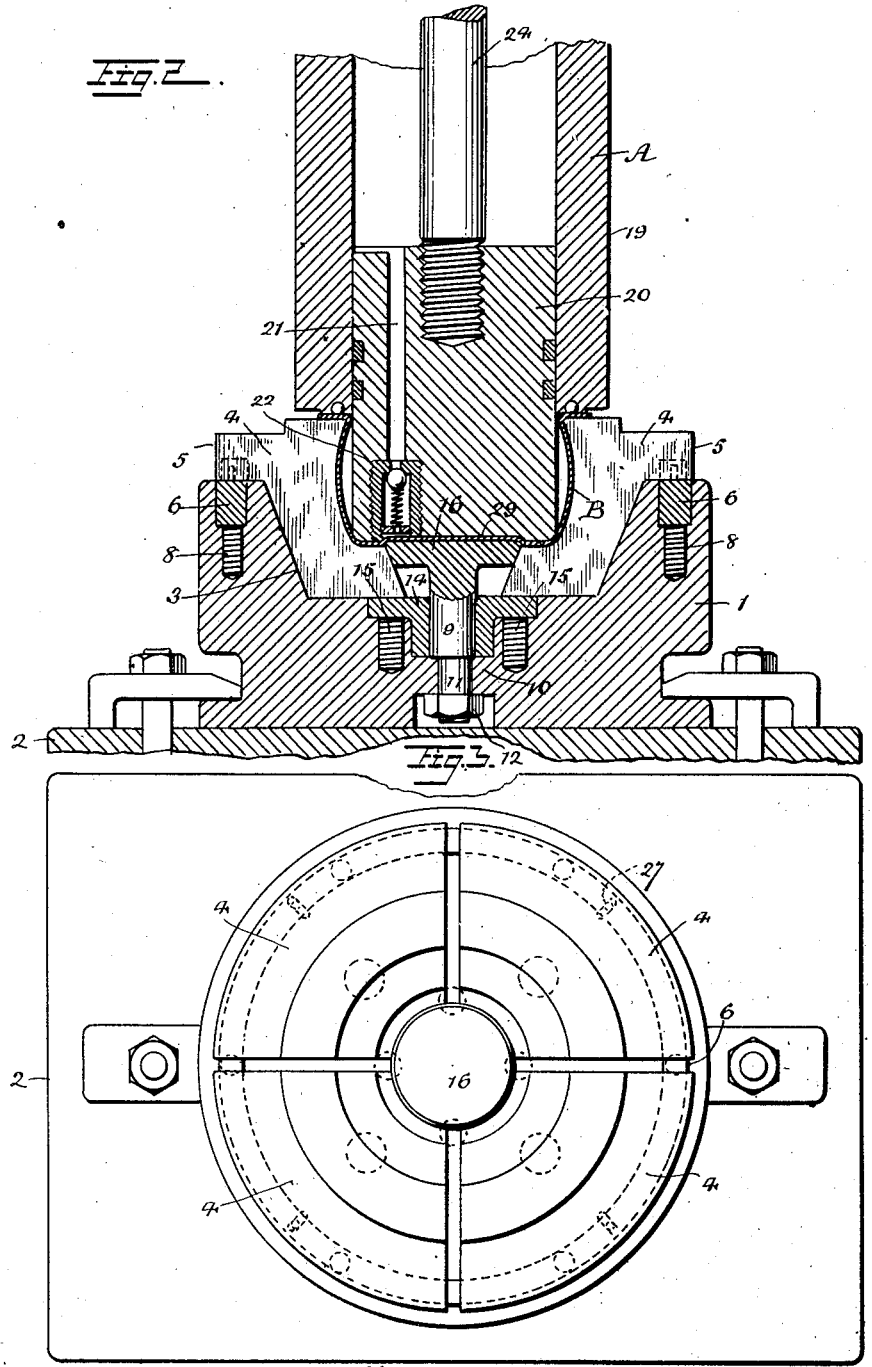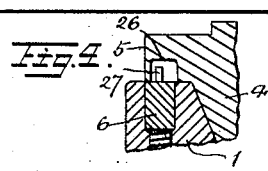

Patented Apr. 30, 1929.

1,711,445

UNITED STATES PATENT OFFICE.

BENJAMIN BURVENICK, OF NEW YORK, N. Y., ASSIGNOR TO LALANCE & GROSJEAN MFG. CO., OF NEW YORK, N. Y., A CORPORATION OF NEW YORK.

ARTICLE-SHAPING APPARATUS.

Application filed January 13, 1928. Serial No. 246,530.

This invention relates to an article shaping apparatus, an object of the invention being to shape by pressure of air a receptacle which is supported in an improved construction and arrangement of die with which a plunger cooperates to compress air in the receptacle and force the walls of the receptacle against the faces of the die to shape the same.

The invention therefore consists in the construction and arrangement of the die and plunger and in the method employed in the shaping of the article, all of which will be more fully hereinafter described and pointed out in the claims.

In the accompanying drawings—

Fig. 1 is a view in longitudinal section showing my improved apparatus in its initial position with a receptacle blank in the die and the plunger elevated;

Fig. 2 is a view similar to Figure 1 showing the position of the parts at the completion of the operation;

Fig. 3 is a plan view of the die and its supporting block; and

Fig. 4 is a fragmentary view in vertical section showing how the separate die sections are held against displacement.

1 represents my improved die block, which may be clamped to a support 2 of any suitable character, and which is made with a tapering or conical recess 3 in its upper face in which a series of die sections 4 are mounted and are movable.

These die sections 4 have an internal shape conforming to the external shape of the receptacle to be formed therein, and externally they have outwardly projecting shoulders 5 which rest upon a ring 6, and this ring 6 is movable in a circular groove 7 in block 1, and supported by a series of coiled springs 8 seated in the block.

The die sections 4 have their lower or main portions externally tapered or inclined to move within the recess 3 and engage the inclined walls of said recess to cause said sections to move toward each other as the sections are moved downwardly, and to separate as the sections move upwardly due to the action of the springs 8.

9 represents a stud, which is in the nature of a central post fixedly secured in the center and lower portion of the die block 1, said die block having a web 10 through which a threaded lug 11 on stud 9 projects, and a nut 12 is screwed onto the lower end of the lug 11 to securely clamp the stud in place. The stud has an annular shoulder 13 resting on the web 10 so as to hold the stud against downward movement.

A flanged sleeve, or pressure ring 14 as it is more properly termed, fits around the stud 9 and under the die sections 4, and a series of coiled springs 15 seated in block 1 exert upward pressure on the ring 14. A head 16 is formed or otherwise fixed to the upper end of the stud 9 and has an external bevel which is adapted to engage an internally beveled face 17 of each die section 4 so as to force said die sections apart when said sections are moved upwardly relative to the die block.

In addition to the springs 8 above referred to the die sections 4 are pressed upwardly by coiled springs 18 engaging the lower faces of the die sections and seated in block 1.

Above the die block and die sections a vertically movable plunger construction is located, indicated generally by the reference character A, and this plunger construction includes an outer sleeve 19 with a plunger 20 movable therein and having airtight juncture therewith, and this plunger 20 has an air passage 21 therethrough with a spring-pressed check valve 22 which is designed to prevent a vacuum in the receptacle being shaped during the upward or outward movement of the plunger.

It is of course not necessary to describe in detail any particular means for causing the plunger and sleeve to move vertically, but I have shown a vertically movable member 23 to which the sleeve 19 is connected, and a rod 24 carrying the plunger 20; and it is to be understood that these members move together and the plunger has an independent movement during the operation of the apparatus.

The lower end of the sleeve 19 carries a ring or gasket 25 for a purpose which will be hereinafter explained. I employ the reference character B to indicate both the blank shown in Figure 1 and the finished receptacle shown in Figure 2.

The die sections, or rather the outward projections 5 thereof, are provided with recesses 26 in which upwardly projecting pins 27 on rings 6 extend so as to hold the die sections against displacement.

In carrying out the operation of shaping the receptacle, a blank B is located in the die formed by the sections 4 and has at its upper open end a laterally projecting flange 28 which rests upon the upper faces of the die sections, and at the beginning of the operation the positions of the several parts are as indicated in Fig. 1.

As the plunger assemblage A moves downwardly, the ring or gasket 25 will engage the flange 28 of blank B, and the continuing downward movement of the plunger assemblage will exert a downward pressure on the die sections 4 causing said die sections to move downwardly and at the same time to move inwardly by reason of the beveled contacting walls of recess 3 and said die sections.

This downward movement of the die sections will force the head 16 of stud 9 to be pressed into the bottom of the blank B in co-operation with a correspondingly shaped recess 29 in the end of plunger 20, although this shaping is not completed until the plunger reaches its lowermost position, as shown in Figure 2.

As the plunger moves downwardly it will entrap air in the blank B and this air cannot escape by reason of the fact that the gasket 25 tightly pressed against the flange 28 of the blank insures a tight seal. As the plunger moves downwardly in the blank the air is compressed and forced upwardly or laterally forcing the walls of the blank to the curvature or other shape of the interior of the die faces of the several sections 4.

It is of course to be understood that air may be forced downwardly through the duct 21 in the plunger 20, if sufficient air is not entrapped, but it will be noted that when the sleeve 19 first engages the flange 28 the air in the sleeve below the plunger as well as the air in the receptacle is entrapped so that there is a volume of air sufficient for all ordinary purposes to cause the receptacle to be shaped unless the walls of such receptacle are unusually thick, but in the manufacture of ordinary kitchen utensils and the like the operation of shaping can be carried out without additional air pressure.

In order to prevent any possibility of the receptacle being drawn out of shape by the upward movement of the plunger the check valve 22 is provided which acts as a relief to prevent any possibility of suction or partial vacuum within the receptacle.

When the plunger assemblage A moves upwardly, the die sections will follow for a predetermined distance and will move upwardly and outwardly, expanding the die, to allow the receptacle shaped therein to be easily removed.

An apparatus of this character can be rapidly operated to produce a large number of receptacles in a relatively small space of time and the economy of production is apparent, and while I believe the structure illustrated to be best adapted for the purpose intended it is to be understood that I do not wish to limit myself to the specific details of construction employed.

I claim:

1. An apparatus of the character described, including an expansible die adapted to receive a blank therein, a plunger element including a sleeve adapted to engage the blank and form an airtight juncture therewith, a plunger in the sleeve adapted to enter the blank, entrap air therein and force the walls of said blank outwardly against the face of the die to shape the blank, and a relief check valve in said plunger preventing partial vacuum on the outward movement of the plunger.

2. An apparatus of the character described, including a die block, upwardly spring-pressed die sections in said block, a headed stud in the block located centrally in the die sections, a plunger element including a sleeve, and a plunger therein, said sleeve adapted to engage a flange of a blank located in the die sections and entrap air in the blank and in the sleeve whereby when said plunger is moved downwardly the air thus entrapped will force the walls of said blank outwardly.

3. An apparatus of the character described, including a die block, upwardly spring-pressed die sections in said block, a headed stud in the block located centrally in the die sections, a plunger element including a sleeve, and a plunger therein, said sleeve adapted to engage a flange of a blank located in the die sections and entrap air in the blank and in the sleeve whereby when said plunger is moved downwardly the air thus entrapped will force the walls of said blank outwardly, and said plunger having a recess in its lower face co-operating with the head of said stud to shape the bottom of the blank.

Signed at Woodhaven, in the county of Queens and State of New York, this 9th day of January A. D. 1928.

BENJAMIN BURVENICK.